US006986446B2

(12) United States Patent
Murray et al.

(10) Patent No.: US 6,986,446 B2
(45) Date of Patent: Jan. 17, 2006

(54) GUN MOUNT APPARATUS

(75) Inventors: Kurt R. Murray, Carmel, IN (US); Jeffrey T. Bounds, Fishers, IN (US)

(73) Assignee: Pro-gard Products, LLC, Indianapolis, IN (US)

( * ) Notice: Subject to any disclaimer, the term of this patent is extended or adjusted under 35 U.S.C. 154(b) by 53 days.

(21) Appl. No.: 10/366,240

(22) Filed: Feb. 12, 2003

(65) Prior Publication Data

US 2003/0150972 A1    Aug. 14, 2003

Related U.S. Application Data

(60) Provisional application No. 60/357,086, filed on Feb. 12, 2002.

(51) Int. Cl.
*B60R 7/00* (2006.01)
(52) U.S. Cl. .............. 224/275; 224/552; 224/557; 224/569; 224/913; 211/64
(58) Field of Classification Search ........... 224/275, 224/282, 547, 552, 553, 557, 569, 570, 571, 224/913; 211/64
See application file for complete search history.

(56) References Cited

U.S. PATENT DOCUMENTS

| | | | | |
|---|---|---|---|---|
| 505,320 | A | * | 9/1893 | Meadows ............... 211/64 |
| 2,535,564 | A | * | 12/1950 | Campbell .............. 224/550 |
| 2,668,645 | A | | 2/1954 | Pease |
| 2,783,896 | A | * | 3/1957 | Agostini et al. ........... 211/64 |
| 3,326,385 | A | | 6/1967 | Pinkerton et al. |
| 3,473,673 | A | | 10/1969 | Porter |
| 3,727,813 | A | * | 4/1973 | Eby ..................... 224/540 |
| 3,767,093 | A | | 10/1973 | Pinkerton et al. |
| 3,802,612 | A | | 4/1974 | Smith |
| 3,857,491 | A | | 12/1974 | Townsend et al. |
| 3,942,691 | A | | 3/1976 | Sisak |
| 4,132,315 | A | | 1/1979 | Young |
| 4,364,499 | A | | 12/1982 | McCue |
| 4,505,411 | A | | 3/1985 | Munn |
| 4,560,134 | A | | 12/1985 | Klein |
| 4,579,263 | A | | 4/1986 | Ehmke et al. |
| 4,696,461 | A | * | 9/1987 | Zelinski ................. 269/16 |
| 4,747,280 | A | | 5/1988 | Shaw |
| 4,881,386 | A | | 11/1989 | Glines |
| 4,936,531 | A | * | 6/1990 | Bauser ................ 224/42.11 |
| 5,116,010 | A | | 5/1992 | McMasters et al. |
| 5,129,563 | A | | 7/1992 | Dillon |
| 5,339,966 | A | | 8/1994 | Bastiaans |
| 5,350,094 | A | | 9/1994 | Morford |
| 5,531,368 | A | | 7/1996 | Morford |
| 5,536,057 | A | | 7/1996 | Stewart |
| 5,779,120 | A | | 7/1998 | Morford |
| 5,799,850 | A | * | 9/1998 | Ryder .................... 224/539 |
| 5,816,546 | A | | 10/1998 | Miller |
| D401,213 | S | * | 11/1998 | Inchaurregui .......... D12/406 |
| 5,934,112 | A | | 8/1999 | Rice et al. |
| 5,979,846 | A | | 11/1999 | Fluhr |
| 6,047,870 | A | | 4/2000 | Morford |

(Continued)

OTHER PUBLICATIONS

"Vehicular Long-Barrel Weapons Mount" by David W. Pisenti, FBI Law Enforcement Bulletin (May 1991), pp. 10-13.

(Continued)

*Primary Examiner*—Stephen K. Cronin
(74) *Attorney, Agent, or Firm*—Baker & Daniels LLP

(57) ABSTRACT

A mounting apparatus for supporting an article, such as a weapon within a vehicle.

46 Claims, 13 Drawing Sheets

U.S. PATENT DOCUMENTS 6,360,931 B1    3/2002   Morford
6,457,618 B1 * 10/2002   Hancock et al. ............ 224/401
6,457,685 B1 * 10/2002   Taylor ........................ 248/166

OTHER PUBLICATIONS

Gant's Law Enforcement Equipment Company catalog, 1989-90, cover, pp. 19, 143, 145-147.
Big Sky Racks, Inc. "Law Enforcement Weapon Mounts" brochure, 8 pgs. (2000/20001).
Big Sky Racks, Inc. "Law Enforcement Weapon Mounts; Dual Air Bag Friendly" brochure, 8 pgs. (Nov. 1999).
Big Sky Racks, Inc. Mounting Instructions for ELS System Models undated.
Big Sky Racks, Inc. "Law Enforcement Weapon Mounts; Dual Air Bag Friendly" brochure, 3 pgs. undated.
Big Sky Racks, Inc. "Law Enforcement Weapon Mounts; Dual Air Bag Friendly" brochure, 6 pgs. undated.
Troy Products 2001 Vehicle Equipment Catalog, Public Safety Vehicle Accessories catalog, 49 pgs.
Troy Products Public Safety Products brochure, 6 pgs. (1993).
Troy Products, Troy Command Consoles, "As the public counts on you, you can count on Troy." advertising, 2 pgs. undated.
Troy Products, Troy Custom Products, "When you have ideas for something new, it's our custom to listen." advertising, 2 pgs. undated.
Troy Products, Troy Prisoner Partitions, "Watch your back. Put something you trust behind you. Troy." advertising, 2 pgs. undated.
Troy Products, Stash-N-Stow™ Partition, Troy-bilt Consoles advertising, 1 pg. (1995).
Inch's Tooling & Machining "Internal and External Vehicle Brakets" advertising, 12 pgs. (1999).
Jon Beau Inc. "Airbag Safe" brochure, 2 pgs. undated.
Jon Beau Inc. advertising, "Airbag Safe" Communication Consoles, MDT Mounts, Shotgun Locks, 1 pg. undated.
Jon Beau Inc. advertising, New Floor Mounted Shotgun Lock, 1 pg. undated.
Jon Beau Inc. advertising, Cage or Trunk Mounted Shotgun Lock, 1 pg. undated.
Pro-Gard Gun Rack Installation Instructions (at least as early as 1985).
Pro-Gard Industries brochure, Gun Locks, 3 pgs.(at least as early as 1994).
Pro-Gard Industries brochure, Gun Locks, 6 pgs. (at least as early as 1996).
Pro-Gard Gun Industries 1998 Product Catalog, Locks and Mounts (2 pgs.).

* cited by examiner

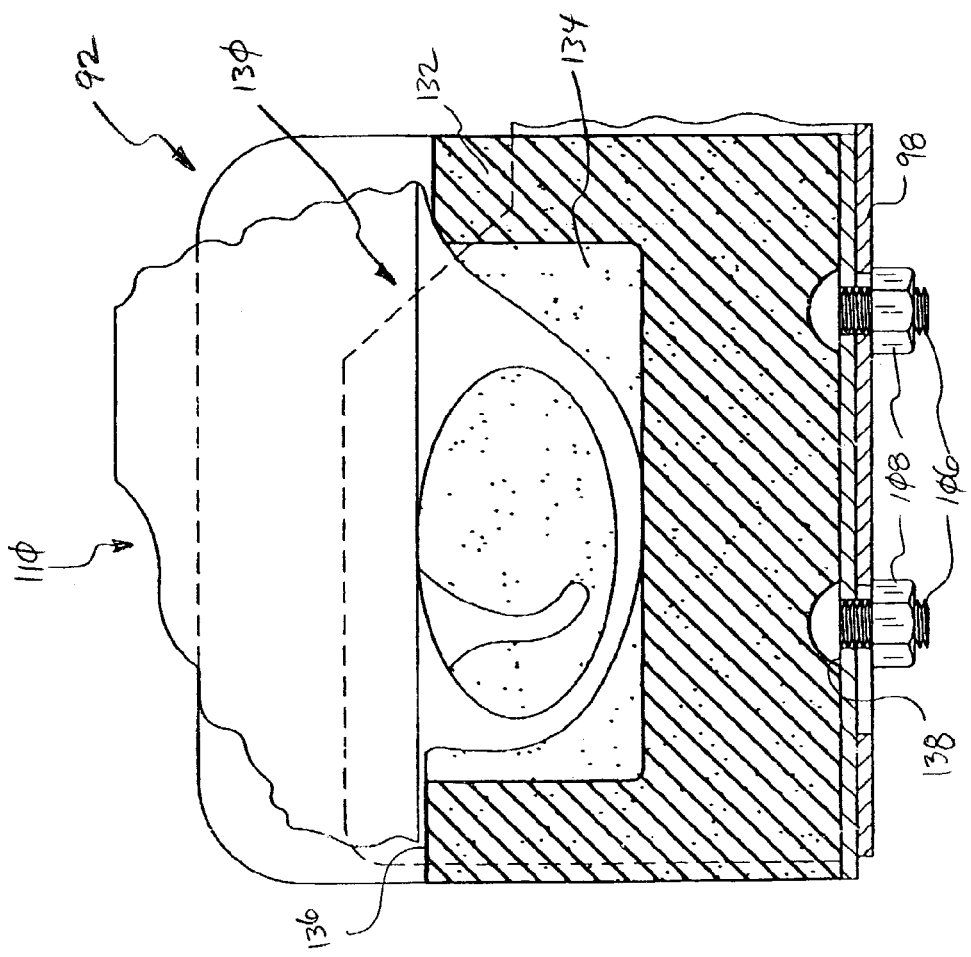
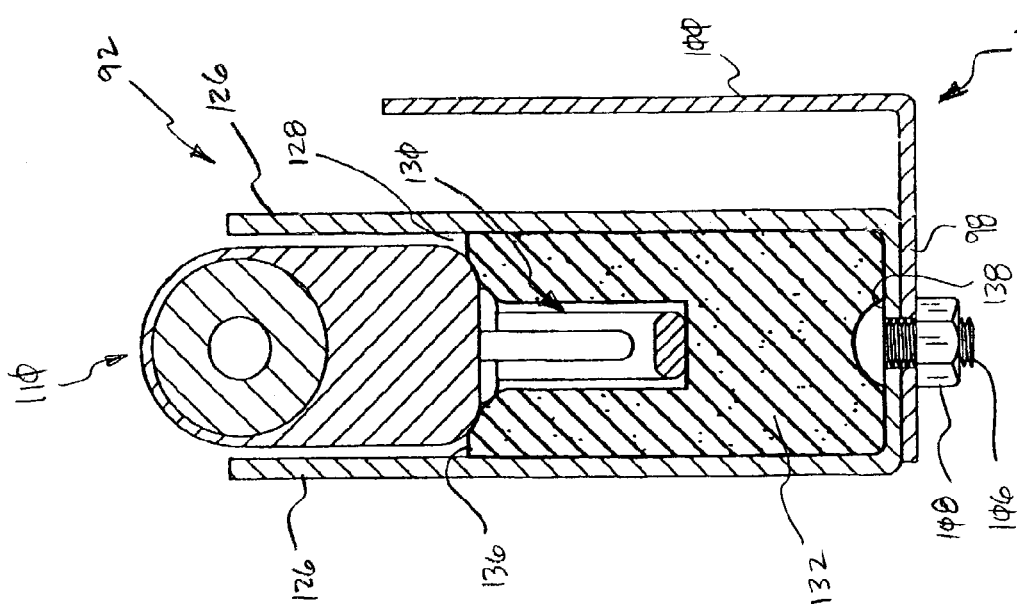

GUN MOUNT APPARATUS

CROSS-REFERENCE TO RELATED APPLICATION

This application claims the benefit of U.S. Provisional Application Ser. No. 60/357,086, filed Feb. 12, 2002, the disclosure of which is expressly incorporated by reference herein.

BACKGROUND OF THE INVENTION

1. Field of the Invention

The present invention relates generally to weapon holders and, more particularly, to mounting devices for supporting gun racks within the passenger compartments of automotive vehicles. The present invention further relates to mounting devices for supporting a plurality of articles within proximity to the front driver seat of an automotive vehicle.

2. Description of the Related Art

Gun racks for supporting weapons inside of the passenger compartments of automotive vehicles are well-known in the art. The prior art teaches that such gun racks may be mounted against a window, a screen, or a wall of a vehicle in order to support a weapon in a generally horizontal manner. In addition, it is known to provide vehicle gun racks for supporting a gun in an upstanding position with the butt of the gun extending upwardly from the floor as illustrated in U.S. Pat. No. 4,747,280 to Shaw.

It is further known to provide a gun rack for supporting a gun adjacent to the ceiling of a passenger compartment of the vehicle, particularly for the purposes of concealing the gun and for providing access to the gun carried by the gun rack to a person in a front seat of the vehicle. For example, U.S. Pat. No. 5,816,546 to Miller, which is assigned to the assignee of the present invention and is expressly incorporated by reference herein, discloses a clamp for a vehicle gun rack.

Additional features and advantages of the present invention will become apparent to those skilled in the art upon consideration of the following detailed description when taken in conjunction with the accompanying drawings.

SUMMARY OF THE INVENTION

The present invention relates to a mounting apparatus for supporting a weapon within the passenger compartment of a vehicle.

In an illustrative embodiment of the present invention, the mounting apparatus includes a substantially U-shaped base frame having an elongated support with opposing first and second ends. First and second mounting members are connected to the first and second ends of the support, respectively, and extend substantially perpendicularly thereto. The first and second mounting members include mounting apertures configured to receive a first seat mounting stud and a second seat mounting stud, respectively. The seat mounting studs secure the base frame to the floor of the vehicle behind one of the front driver seat and the front passenger seat.

An upright extends in a generally vertical direction from the base frame. The upright is angled from vertical in order to follow the contour of the back of the front seat and to provide a clearance area for the reclining of the front seat. A coupler connects the upright to the base frame and includes a first pivot connector and a second releasable connector. The releasable connector has a shear strength less than the pivot connector such that force applied to the upright will cause the releasable connector to shear before the pivot connector. Once the releasable connector is released from connecting the upright to the base frame, the upright is free to pivot rearwardly toward the back passenger seat upon application of a rearwardly directed force by the front seat. An inhibiting member is configured to prevent pivoting movement of the upright frontwardly toward the front occupant area of the vehicle.

Illustratively according to the invention, the base frame includes a first portion and a second portion telescopingly received within the first portion. As such, the relative distance between the first and second mounting members may be adjusted as required for installation on different automobiles. More particularly, the mounting apertures may be easily aligned with the seat mounting studs of a variety of vehicles thereby eliminating the need to permanently deform the vehicle.

Further illustratively according to the invention, a weapon holder or gun rack is supported by the upright in a generally vertical direction. The gun rack includes an elongated support defining a longitudinal axis, the elongated support positioned with the longitudinal axis extending substantially parallel to the upright. The gun rack illustratively includes a barrel rest provided adjacent an upper end of the elongated support for receiving a barrel of a weapon, and a lock mechanism provided at a central portion of the elongated support for receiving and securing the weapon therein.

The gun rack may further include a weapon trigger guard provided on a lower end of the elongated support for receiving a trigger portion of a weapon therein. The weapon trigger guard illustratively includes a base having two spaced apart side walls which extend outwardly from the base to form a channel for receiving a trigger assembly of the weapon. The trigger guard may further include an insert secured in the channel and including a slot in an outer surface thereof for receiving a trigger and trigger guard of the weapon.

In a further illustrative embodiment of the present invention, a mounting apparatus is provided for supporting articles within a passenger compartment of a vehicle intermediate the front driver seat and the front passenger seat. The mounting apparatus includes a base having a support and first and second downwardly extending side walls. First and second mounting members extend outwardly from the first and second side walls, respectively. The first and second mounting members include mounting apertures configured to receive a right front driver seat mounting stud and a left front passenger seat mounting stud, respectively, for attaching the base to the floor of the vehicle. The side walls are configured to position the support above a drive shaft hump of the vehicle. An upright extends upwardly from the base in a generally vertical direction and supports at least one accessory mount.

Illustratively according to the invention, the mounting apparatus includes a cup holder having a centrally disposed opening formed within the support and a mounting ring supported thereabove for holding a beverage container.

Further illustratively according to the invention, the at least one accessory mount includes at least one of a weapon holder, a flashlight mount, and an audio speaker.

Illustratively according to the invention, the weapon holder includes a butt housing coupled to the support and a gun lock supported proximate an upper end of the upright.

According to a further illustrative embodiment of the present invention, a mounting apparatus is provided for supporting articles within a vehicle including front and rear occupant areas, and driver and passenger seats supported within the front occupant area, the mounting apparatus comprising a base including a support and first and second mounting members coupled to the support, the first and second mounting members configured to be secured to the floor of the vehicle. An upright extends upwardly from the base in a generally vertical direction, and a coupler connects the upright to the base and is configured to permit selective movement of the upright in a generally horizontal direction relative to the base. An accessory mount is coupled to at least one of the base and the upright.

In a further illustrative embodiment of the present invention, a mounting apparatus is provided for supporting articles within a vehicle including front and rear occupant areas, and driver and passenger seats supported by seat mounting studs within the front occupant area, the mounting apparatus comprising a base including a support, first and second side walls extending downwardly from the support, and first and second mounting members extending outwardly from the first and second side walls. The first mounting member includes an aperture configured to receive a seat mounting stud of the driver seat and the second mounting member includes an aperture configured to receive a seat mounting stud of the passenger seat. An upright extends upwardly from the base in a generally vertical direction, the upright having opposing upper and lower ends and a plurality of mounting apertures, the lower end being coupled to the support of the base. An accessory mount is coupled to at least one of the mounting apertures of the upright.

According to a further illustrative embodiment of the present invention, a method of supporting an accessory within a vehicle includes the steps of providing a first base including a support and first and second mounting members coupled to the support, the first and second mounting members configured to couple to seat mounting studs of a first vehicle, and coupling the first base to the floor of the first vehicle through the seat mounting studs. The method further comprises the steps of providing an upright, coupling the upright to the first base, and providing a second base including a support and first and second mounting members coupled to the support, the first and second mounting members configured to couple to seat mounting studs of a second vehicle. The method further comprises the steps of coupling the second base to the floor of the second vehicle through the seat mounting studs, uncoupling the upright from the first base, removing the upright from the first vehicle, and coupling the upright to the second base.

In a further illustrative embodiment of the present invention, a mounting apparatus is provided for supporting a weapon within a vehicle including front and rear occupant areas. The mounting apparatus includes a base configured to be secured to a seat belt mount in the rear occupant area of the vehicle. A support including opposing first and second ends is positioned in spaced relation to the base. An upright connects the base and the support, and a weapon holder configured to receive a weapon is coupled to the support.

Illustratively according to the invention, a strengthening member is positioned in spaced relation to the upright. The upright connects the first end of the support to the base and the strengthening member connects the second end of the support to the base.

Further illustratively according to the invention, a first frame defines the base, the upright, and the support, and a second frame defines the base and the strengthening member.

Illustratively according to the invention, the base includes a mounting member having a mounting aperture configured to receive a seat belt mounting stud.

Further illustratively according to the invention, the weapon holder includes a barrel rest configured to receive a barrel of a weapon, and a lock mechanism provided in spaced relation to the barrel rest, the lock mechanism configured to receive and secure the weapon therein. A weapon trigger guard may be provided in spaced relation to the lock mechanism and is configured to receive a trigger portion of the weapon therein.

Additional features and advantages of the present invention will become apparent to those skilled in the art upon a consideration of the following detailed description of illustrative embodiments exemplifying the best mode of carrying out the invention as presently perceived.

BRIEF DESCRIPTION OF THE DRAWINGS

The detailed description of the drawings particularly refers to the accompanying figures in which:

FIG. 5 is a longitudinal cross-sectional view of an illustrative embodiment weapon trigger guard of the present invention;

FIG. 6 is a lateral cross-sectional view of the weapon trigger guard of FIG. 5;

DETAILED DESCRIPTION OF THE DRAWINGS

Figure 1:
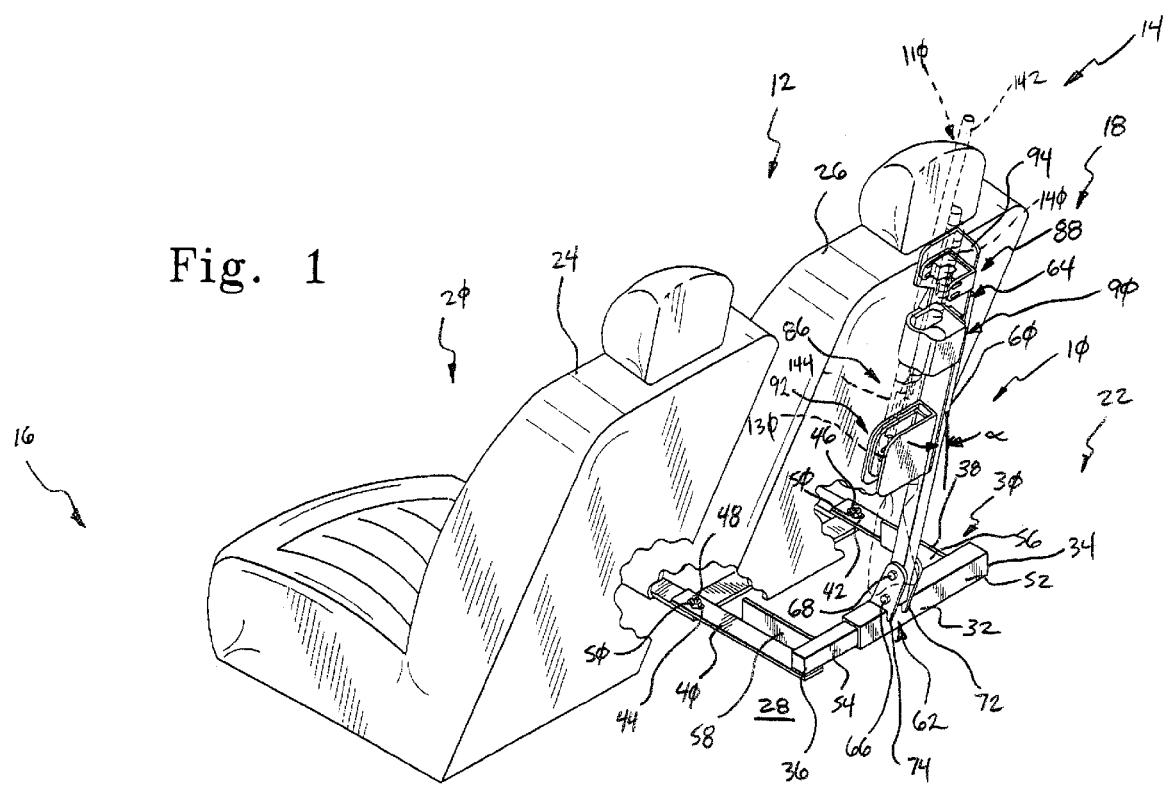
FIG. 1 is a perspective view of a mounting apparatus of the present invention installed within the passenger compartment of a vehicle, illustrating a weapon installed within the gun rack.

Referring now to the drawings, FIG. 1 illustrates a mounting apparatus 10 of the present invention as installed within the passenger compartment 12 of a vehicle 14. The vehicle 14 may comprise any conventional automobile including, but not limited to, a police car. The vehicle 14 illustratively includes longitudinally extending driver and passenger sides 16 and 18 and laterally extending front and rear occupant areas 20 and 22. The front occupant area 20 illustratively includes a conventional driver seat 24 positioned proximate the driver side 16 of the vehicle 14, and a conventional front passenger seat 26 positioned proximate the passenger side 18 of the vehicle 14. While it is envisioned that the front seats 24 and 26 comprise individually adjustable, or bucket, seats, it should be appreciated that the mounting apparatus 10 will find applicability with other seating arrangements, including conventional bench seats.

Referring further to FIG. 1, the mounting apparatus 10 is illustratively secured to a floor 28 of the vehicle 14 within the rear occupant area 22. More particularly, the mounting apparatus 10 is illustratively mounted directly behind the front passenger seat 26 such that the mounting apparatus 10 is easily accessible to an individual sitting in the driver seat 24. While such a mounting arrangement is envisioned as the preferred location, it should be appreciated that the mounting apparatus 10 may be supported in other locations within the passenger compartment 12, including on the floor 28 either behind the driver seat 24 or on the floor 28 in front of the passenger seat 26.

The mounting apparatus 10 includes a substantially U-shaped base frame 30 having an elongated support 32 with opposing first and second ends 34 and 36. The base frame 30 further comprises first and second mounting members 38 and 40 connected to the first and second ends of the support 32 and extending substantially perpendicular to the support 32. The first and second mounting members 38 and 40 illustratively comprise substantially flat strip steel and include mounting apertures 42 and 44 to facilitate attachment of the base frame 30 to the floor 28 of the vehicle 14. The apertures 42 and 44 are illustratively formed as elongated slots in order to facilitate installation of the mounting apparatus 10.

More particularly, each mounting aperture 42 and 44 is adapted to receive a seat mounting stud 46 and 48 of conventional design and of the type which is secured to the floor 28 of the vehicle 14 by the vehicle manufacturer. In the embodiment of FIG. 1, the mounting aperture of the first mounting member 38 is secured to the left mounting stud 46 of the passenger seat 26 while the mounting aperture 44 of the second mounting member 40 is secured to the right mounting stud 48 of the passenger seat 26. Conventional nuts 50 may be utilized to secure the first and second mounting members 38 and 40 to the seat mounting studs 46 and 48. As may be readily appreciated, use of pre-existing seat mounting studs 46 and 48 avoid the necessity of permanently deforming, for example, by drilling, the vehicle 14 in order to install the mounting apparatus 10.

The elongated support 32 may be formed of conventional tubular steel having a rectangular cross section. Illustratively, the elongated support 32 includes a first portion 52 which telescopingly receives a second portion 54 thereby providing for sliding movement between the first and second portions 52 and 54. Sliding movement of the second portion 54 relative to the first portion 52 results in similar movement between the first mounting member 38 and the second mounting member 40. As such, the relative distance between the mounting apertures 42 and 44 may be adjusted as required for installation of the mounting apparatus 10 in vehicles 14 of different design. The adjustability of the first and second mounting members 38 and 40 permits the mounting apparatus 10 to adapt to different spacings of seat mounting studs 46 and 48, thereby again eliminating the necessity of drilling holes or otherwise permanently deforming the vehicle 14 in order to secure the mounting apparatus 10 within the passenger compartment 12.

Strengthening webs 56 and 58 connect the first mounting member 38 to the first portion 52 of the support 32 and the second mounting member 40 to the second portion 54 of the support 32. The strengthening webs 56 and 58 provide additional stability and strength to the structure of the base frame 30.

Figure 2:
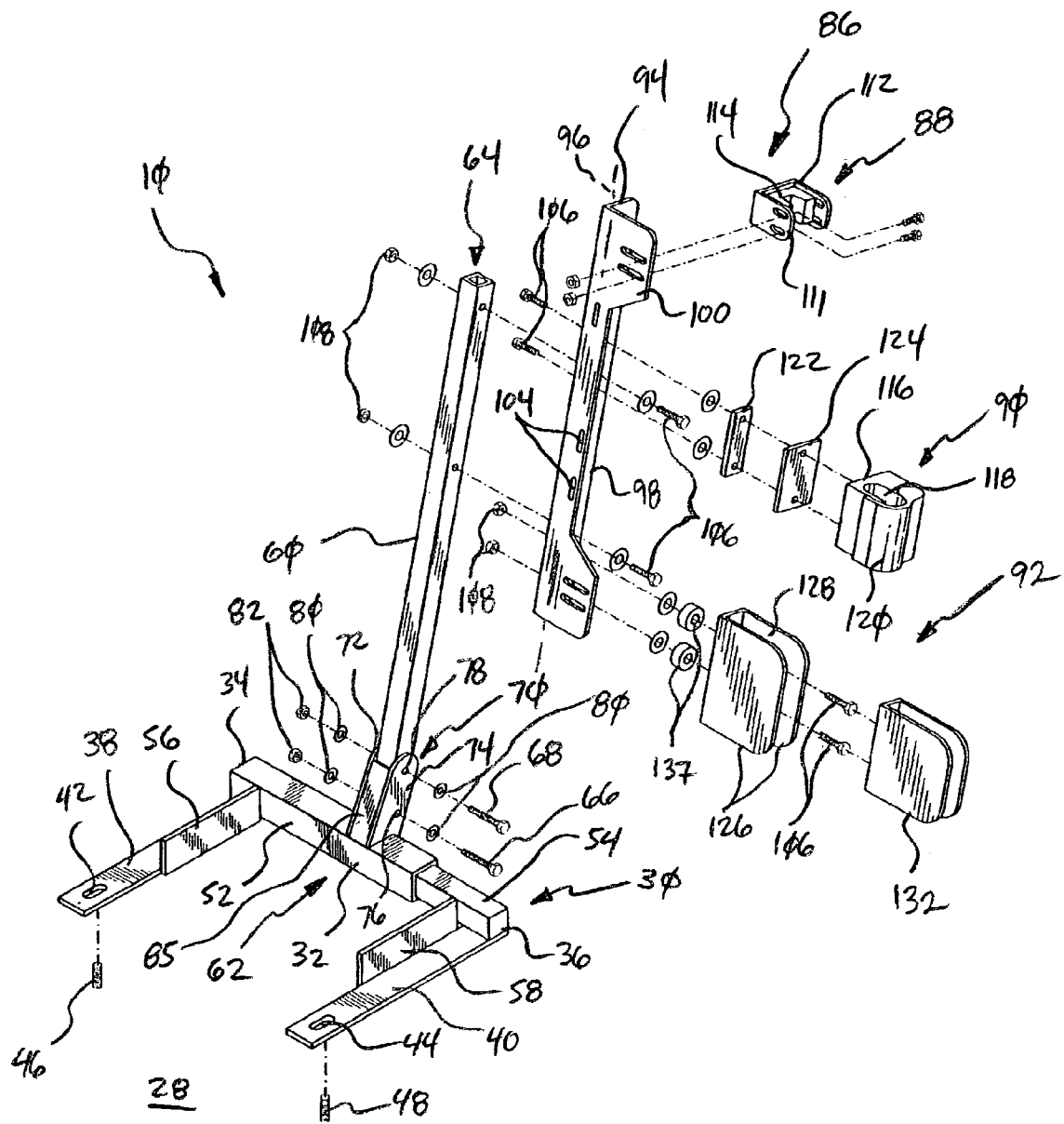
FIG. 2 is an exploded perspective view of the gun mounting apparatus of FIG. 1.

A generally vertically extending upright 60 is connected to the base frame 30 through a coupler 62. The upright 60 may be formed of conventional tubular steel similar to that of the support 32. The coupler 62 is configured to permit selective movement of an upper end 64 of the upright relative to the base frame 30. More particularly, the coupler 62 includes a pivot connector 66 and a releasable or "breakaway" connector 68. A lower end 70 of the upright 60 is received within first and second mounting flanges 72 and 74 of the coupler 62 and is secured therebetween by the pivot connector 66 and the releasable connector 68. The first and second mounting flanges 72 and 74 are positioned in spaced relation to each other and extend upwardly from the support 32. The connectors 66 and 68 may comprise conventional bolts passing through apertures 76 and 78 formed within the mounting flanges 72 and 74, respectively. Conventional washers 80 may be received on the bolts 66 and 68, while conventional nuts 82 may threadably engage the bolts 66 and 68, as illustrated in FIG. 2 thereby securing the upright 60 to the coupler 62. In the illustrative embodiment, the pivot connector 66 comprises a bolt having a shear strength greater than the shear strength of the releasable connector 68. In a preferred embodiment, the pivot connector 66 comprises a grade 5 bolt while the releasable connector 68 comprises an ungraded bolt. It should be appreciated that the shear strength of each connector 66 and 68 provides an indication of the predetermined force required to shear the connector 66 and 68, and is based upon a combination of the minor thread diameter, the type of material and the grade of material of the respective connector 66 and 68.

Figure 3:
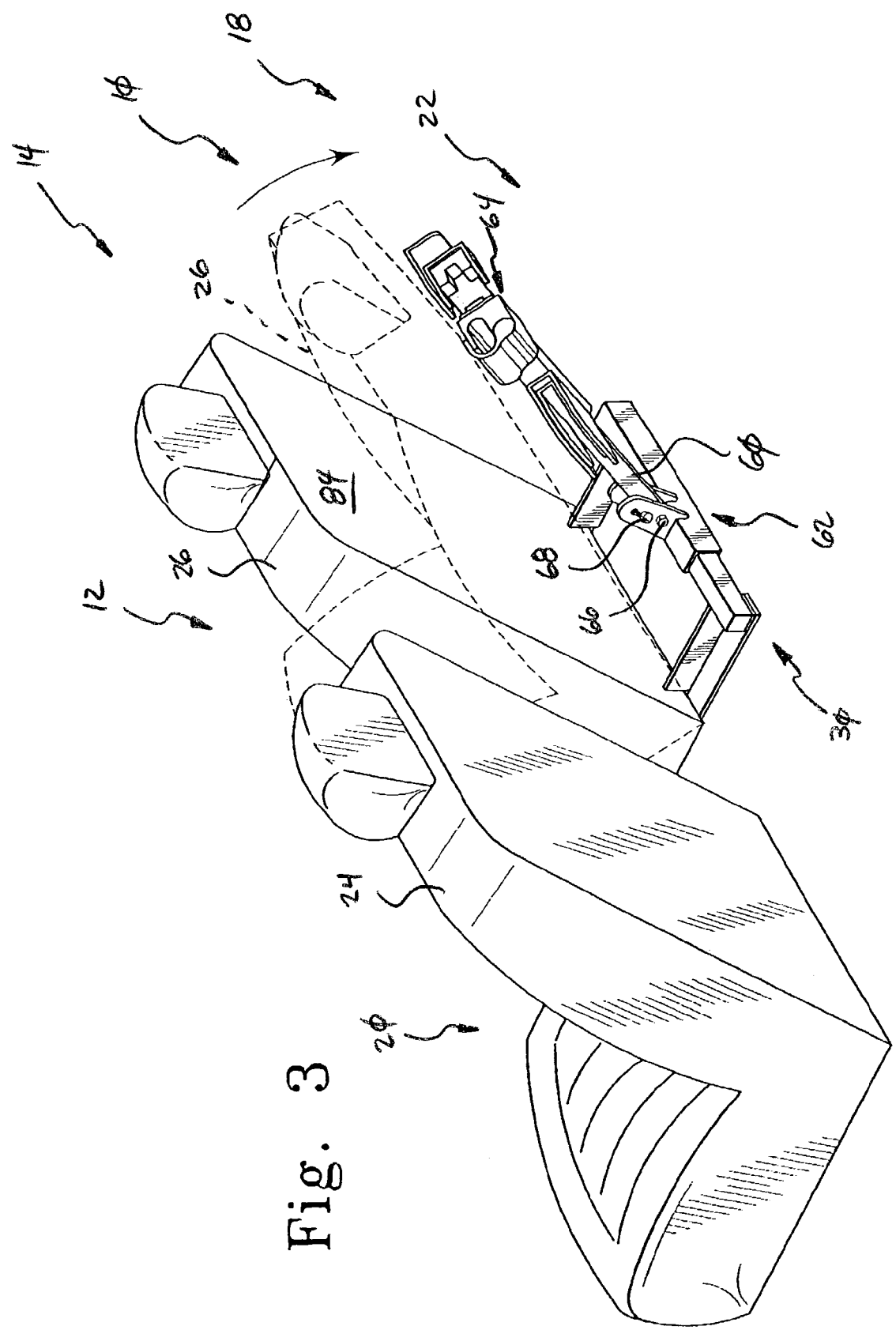
FIG. 3 is a perspective view similar to FIG. 1, illustrating in phantom the back of the front seat forcing the upright rearwardly, thereby causing the coupler to "breakaway" or release the upright for pivoting movement.
Figure 4:
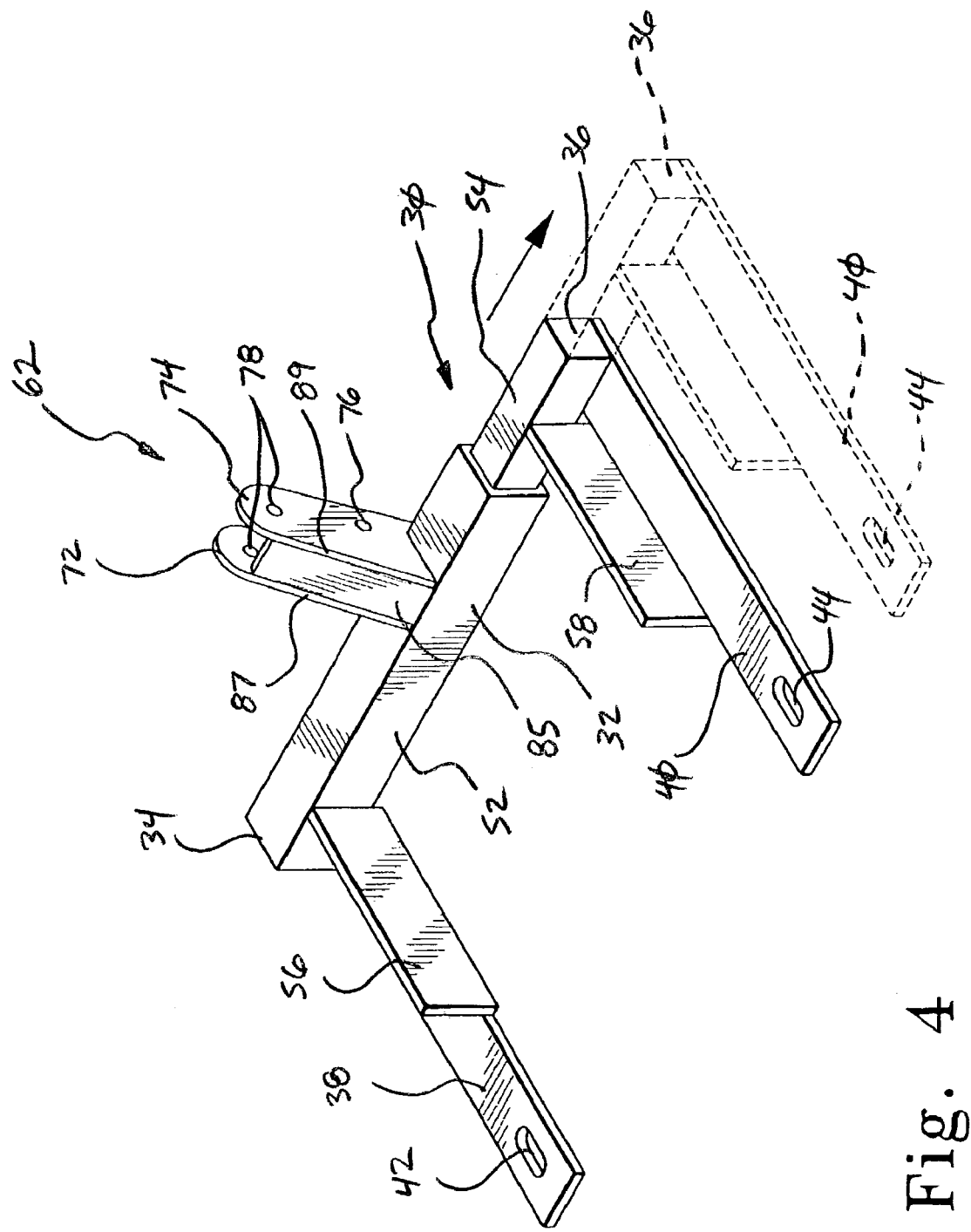
FIG. 4 is a detailed view of the base of the mounting apparatus of FIG. 1, illustrating in phantom the support in an extended position.

Turning now to FIG. 3, the releasable connector 68 facilitates rearwardly pivoting movement of the upright 60 upon application of a predetermined force to an upper end 64 of the upright 60. Should the front seat back 84 move rearwardly into contact with the upper end 64 of the upright 60 with at least a predetermined force, then a moment will develop about the pivot connector 66. When this moment results in a predetermined force applied to the releasable connector 68 that exceeds a predetermined value greater than the shear strength of the releasable connector 68, then the releasable connector 68 will shear and release the upright 60 for rearwardly pivoting movement about the pivot connector 66. As such, rearward movement of the seat back 84 of the front seat 26 is not substantially hindered or prevented by contact with the mounting apparatus 10. Unimpeded backward movement of the seat back 84 is advantageous should the vehicle 14 be involved in an accident, wherein rearward movement of the seat 24 facilitates dispersion of energy resulting from the impact.

An inhibiting member, in the form of a plate 85 is secured proximate front edges 87 and 89 of the first and second mounting flanges 72 and 74. Abutting contact between the upright 60 and the inhibiting plate 85 prevents pivoting movement of the upright 60 in a forward direction toward the front passenger seat 26. As such, the inhibiting plate 85 helps prevent the undesired movement of the upright 60 toward the front occupant area 20 of the vehicle 14.

As shown in FIG. 1, the upright 60 is supported at an angle from vertical in order to accommodate the inclined contour of the driver seat back 84 and to provide a clearance area for reclining movement of the driver seat back 84. The angle is illustratively between 10° and 70° from vertical. In a most preferred embodiment, the upright 60 is disposed at an angle of approximately 22° from vertical.

Referring further to FIGS. 1, 2, 5 and 6, a gun rack or weapon holder 86 is coupled to the upright 60. It should be appreciated that the gun rack 86 is provided for illustrative purposes and that variations thereof may find equal applicability for use within the mounting apparatus 10 of the present invention. More particularly, the upright 60 is configured to accommodate a wide variety of conventional mounting accessories, including gun racks. As such, the mounting apparatus 10 may be easily modified to support a variety of items, including many different conventional weapons.

The gun rack 86 illustratively includes a barrel rest 88, a lock mechanism 90, and a weapon trigger guard 92, all of which are coupled to an elongated support 94. The elongated support 94 is coupled to the upright 60 such that a longitudinal axis 96 of the elongated support 94 is disposed substantially parallel to the upright 60. The elongated support 94 includes a base 98 and a side wall 100, each of which includes mounting holes 102 and/or slots 104 through which mechanical fasteners, such as bolts 106, may extend to secure the gun rack 86 to the upright 60. Conventional nuts 108 may be threadably received on the bolts 106. Each of the barrel rest 88, the lock mechanism 90, and the weapon trigger guard 92, may be coupled to either or both of the base 98 and side wall 100 of the elongated support 94. Such coupling may be adjusted as desired by utilizing the mounting slots 104 and mechanical fasteners 106.

The barrel rest 88 is configured to receive and cradle a front portion of a weapon 110. The barrel rest 88 may be a U-shaped metal bracket 112 having a leg 111 which is secured to the side wall 100 of the elongated support 94. The U-shaped metal bracket 112 may be provided with a layer of padding material 114 such as rubber, dense foamed rubber, or plastic or polymeric material.

The lock mechanism 90 includes a base 116 having a padded, illustratively, felt, covered channel 118 for receiving the weapon 110 and a pivotal cover 120 coupled to the base 116. When the pivotal cover 120 of the lock mechanism 90 is in an open position, the weapon 110 may be placed in the channel 118. Once the weapon 110 is positioned in the channel 118, the pivotal cover 120 may be pivoted into a closed position. When the pivotal cover 120 is pivoted into its closed position, an internal locking mechanism (not shown) provided in the base 116 locks the pivotal cover 120 in its closed position. The internal lock mechanism used in the present invention may comprise an electrically operated lock mechanism having a key override. Such an lock mechanism is illustratively described in U.S. Pat. No. 4,949,559, which is assigned to the assignee of the present invention and which is expressly incorporated by reference herein. It is understood that any conventional gun lock may be used in accordance with the present invention.

Referring further to FIG. 2, the lock mechanism 90 may be secured to the support 94 through conventional bolts 106 and nuts 108. A spacer 122 may be positioned intermediate a cover 124 of the lock mechanism 90 and the support 94 to space the lock mechanism 90 away from the base 98 of the support 94, as needed. The lock mechanism 90 may alternatively be coupled to the elongated support 94 by a conventional L-shaped bracket (not shown) which is provided beneath the base 116. The bracket may include a blocking tab configured to project in front of the lock mechanism 90 so as to provide an abutment that limits rearward movement of the weapon 110.

The weapon trigger guard 92 comprises a U-shaped structure having a pair of spaced apart side walls 126 which define a channel 128 therebetween. The side walls 126 are wide enough to extend beyond the rear and front of the trigger assembly 130 of the weapon 110. The side walls 126 are illustratively tall enough to cradle and shield the portion of the weapon 110 above the trigger assembly 130.

The weapon trigger guard 92 illustratively includes an insert 132 that comprises a block of material which is secured within the channel 128. As illustrated in FIGS. 5 and 6, the insert 132 may include a closed ended slot 134 configured and positioned in an outer surface 136 thereof to receive the trigger assembly 130. The insert 132 is illustratively formed of a padding material which is sufficiently dense to prevent unauthorized persons from gaining access to the trigger assembly 130 by digging their fingers into the insert 132. Suitable materials include hard foam rubbers having a density of about 3–5 pounds per cubic foot and higher, with densities of about 4 pounds per cubic foot being preferred. In alternative embodiments, the insert 132 could be a solid structure formed from a plastic, resinous or polymeric material. In further embodiments, the insert 132 could be formed from a rigid material such as metal, wood, fiberglass, etc., in which case the outer surface 136 of the insert 132 could be provided with a layer of padding such as felt to avoid scratching or marring of the weapon 110.

The weapon trigger guard 92 may be secured to the base 98 of the support 94 through conventional bolts 106 and nuts 108. Cylindrical spacers 137 (FIG. 2) may be used to space the weapon trigger guard away from the base 98 of the support 94, as needed.

The insert 132 may be secured in the weapon trigger guard 92 by mechanical and/or chemical means. For example, the insert 132 can be chemically bonded the bottom 138 and side walls 126 of the channel 128 by means of any suitable glue, cement, epoxy, etc. Mechanical means such as pins, rivets, bolts, flanges, etc., formed on side walls 126, can also be used to secure the insert 132 in the weapon trigger guard 92.

The barrel rest 88 receives the arm 140 and barrel 142 of the weapon 110. The lock mechanism 90 receives a portion of the weapon 110 which is located between the arm 140 and the chamber housing 144. The weapon trigger guard 92 receives the trigger assembly 130.

Figure 7:
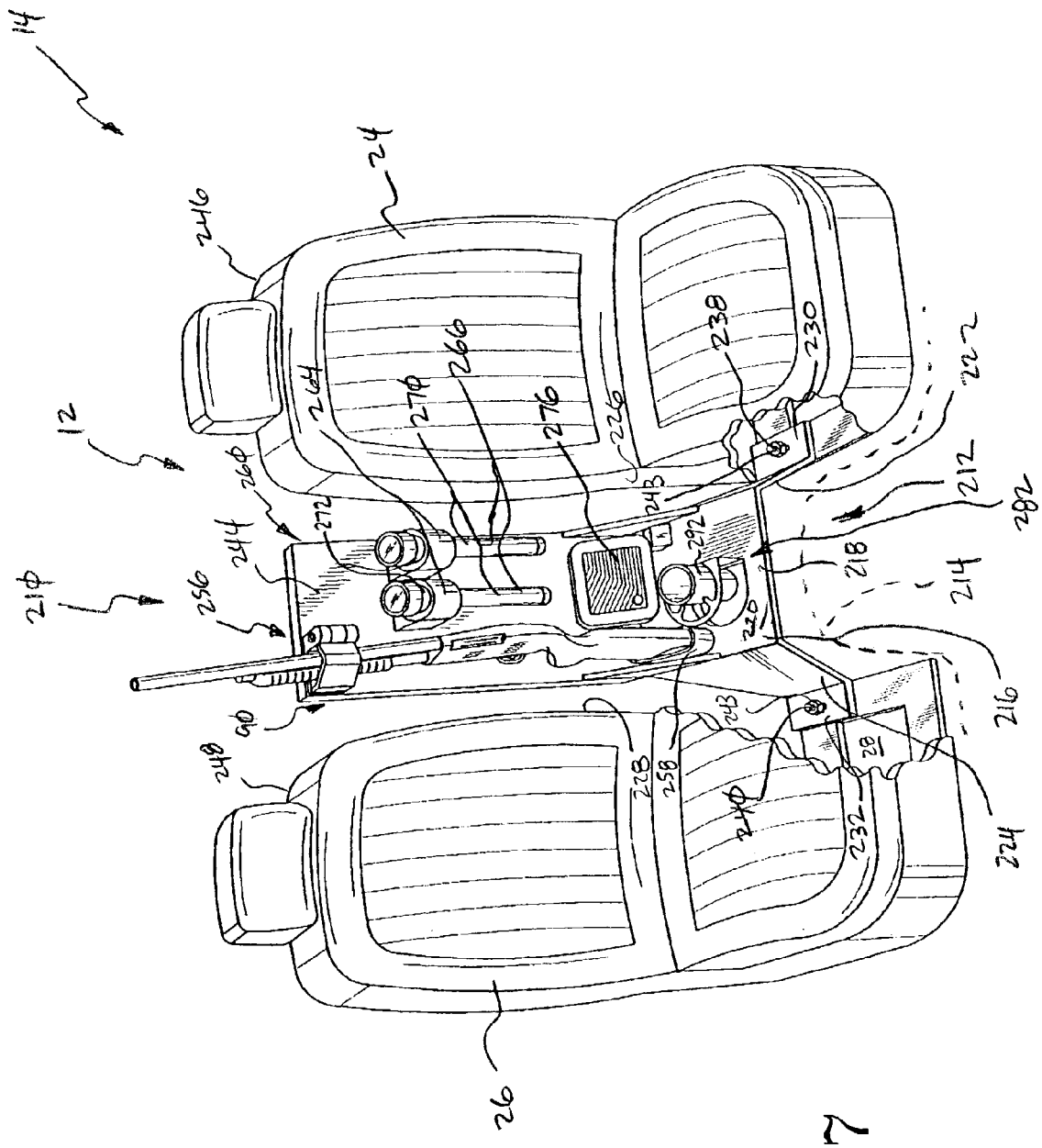
FIG. 7 is a perspective view of an alternative embodiment mounting apparatus of the present invention installed within the passenger compartment of a vehicle intermediate the front driver seat and the front passenger seat.
Figure 8:
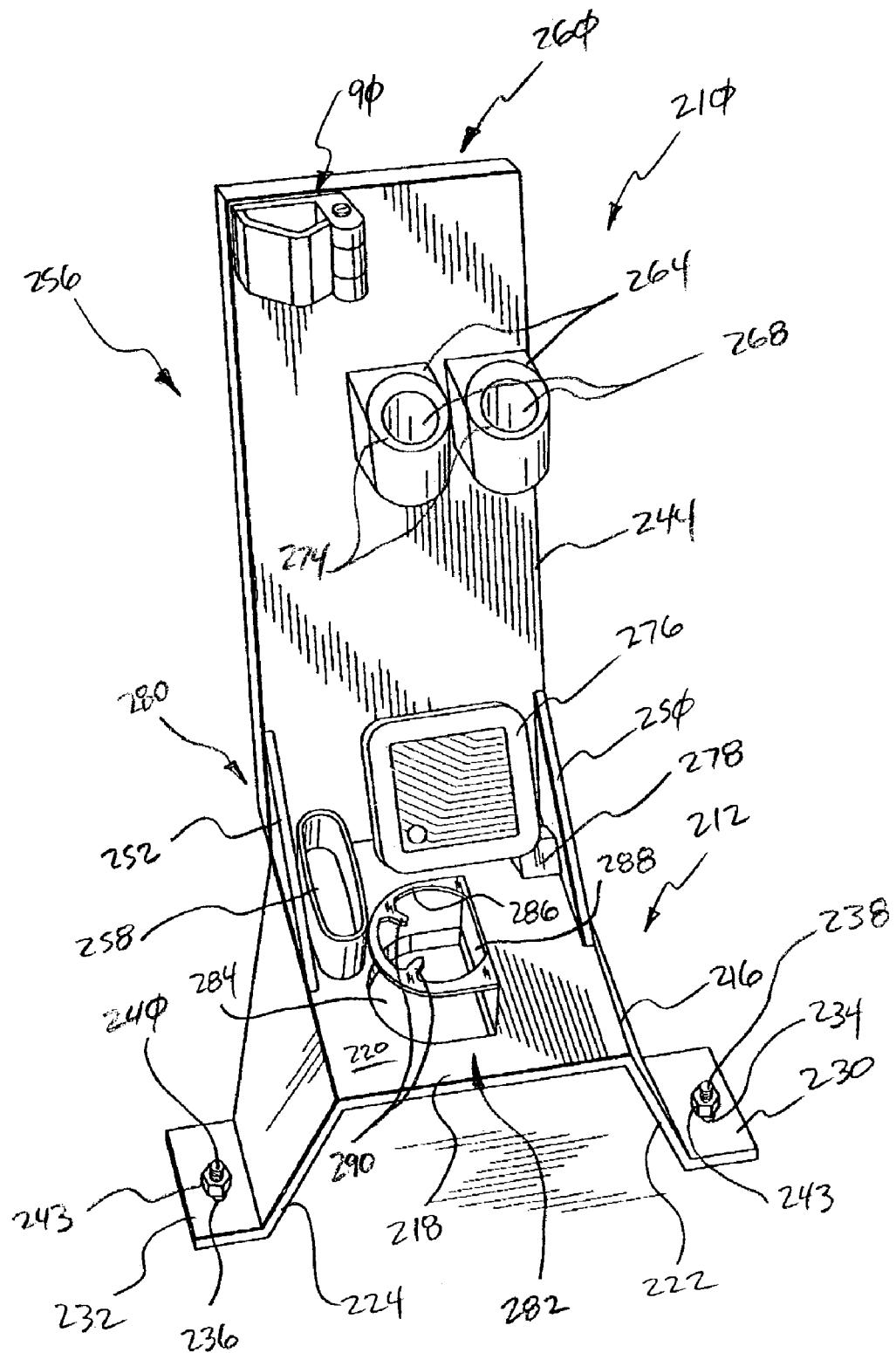
FIG. 8 is a front perspective view of the mounting apparatus of FIG. 7.
Figure 9:
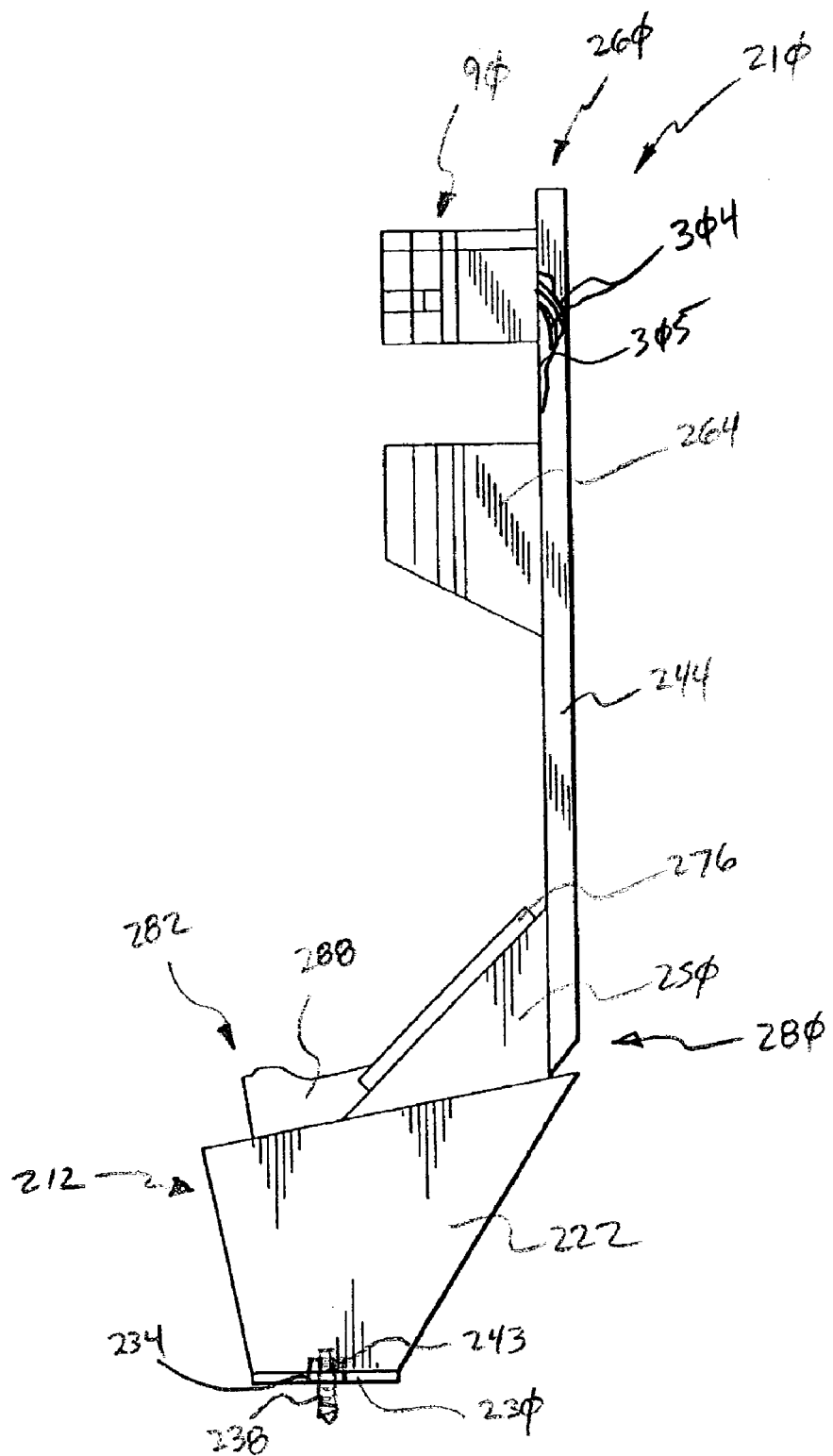
FIG. 9 is a side elevational view of the mounting apparatus of FIG. 7.

Turning now to FIGS. 7–9, a further embodiment of the mounting apparatus 210 of the present invention is illustrated as being positioned within the passenger compartment 12 of the vehicle 14. The mounting apparatus 210 includes a base 212 configured to straddle the conventional drive shaft hump 214 of the vehicle 14 intermediate the front driver seat 24 and the front passenger seat 26. More particularly, the base 212 includes a support 216 illustratively including a mounting platform 218 having a substantially planar support surface 220. First and second side walls 222 and 224 extend downwardly from the support 216 along opposing sides of the drive shaft hump 214 and proximate inner side edges 226 and 228 of the front driver seat and front passenger seat 26, respectively. As such, the mounting platform 218 extends between the first and second side walls 222 and 224 and is configured to extend above the drive shaft hump 214.

The base 212 further includes first and second mounting members 230 and 232 which extend outwardly from the first and second side walls 222 and 224, respectively. The first and second mounting members 230 and 232 each include a mounting aperture 234, 236 for securing the base 212 to the floor 28 of the vehicle 14. The mounting apertures 234 and 236 are illustratively formed as elongated slots in order to facilitate installation of the mounting apparatus 210 and to permit adjustment of the mounting apparatus 210 to a desired position. More particularly, the mounting aperture 234 of the first mounting member 230 is adapted to receive a driver seat mounting stud 238 while the mounting aperture 236 of the second mounting member 232 is adapted to receive a front passenger seat mounting stud 240. More particularly, the mounting stud 238 is positioned proximate the right rear corner of the driver seat 24, while the mounting stud 240 is positioned proximate the left rear corner of the passenger seat 26. Conventional nuts 243 may threadably receive the respective mounting studs 238 and 240 for securing the first and second mounting members 230 and 232 to the floor 28 of the vehicle 14.

An upright 244 extends upwardly from the base 212 in a generally vertical direction and is coupled to the mounting platform 218. As illustrated in FIG. 7, the upright 244 is substantially aligned with, and disposed slightly behind, the backs 246 and 248 of the front driver seat 24 and the front passenger seat 26, respectively. First and second strengthening webs 250 and 252 extend between the upright 244 and the support 216 in order to provide additional structural rigidity to the upright 244.

A plurality of accessory mounts are supported by the mounting apparatus 210 and are illustratively secured thereto by means of conventional fasteners. The accessory mounts may include a weapon holder or gun rack 256 including a lock mechanism 90 and a butt housing 258. The lock mechanism 90 is secured proximate an upper end 260 of the upright 252 and may be of the design described in greater detail above. The butt housing 258 is illustratively secured to the platform 218 of the base 212 and is adapted to receive the butt 262 of a weapon 110.

The accessory mounts may further comprise a pair of flashlight mounts or holders 264 configured to receive a flashlight 266. The flashlight holders 264 may be secured to the upright 252 and each includes a retaining bore 268 configured to receive the body 270 of a flashlight 266. A neck 272 of the flashlight 266 rests on an upper surface 274 defined by the retaining bore 268.

An audio or communication speaker 276 is illustratively supported by a speaker mount 278 secured proximate a lower end 280 of the upright 252. The audio speaker 276 may be of conventional design and linked with a wireless communication system.

A cup holder 282 is coupled to the platform 218 and includes an opening 284 formed within the support surface 220. A retaining ring 286 is supported above the opening 284 by a bracket 288. A plurality of inwardly extending fingers 290 are supported by the retaining ring 286 and are adapted to engage a conventional beverage container 292.

Figure 10:
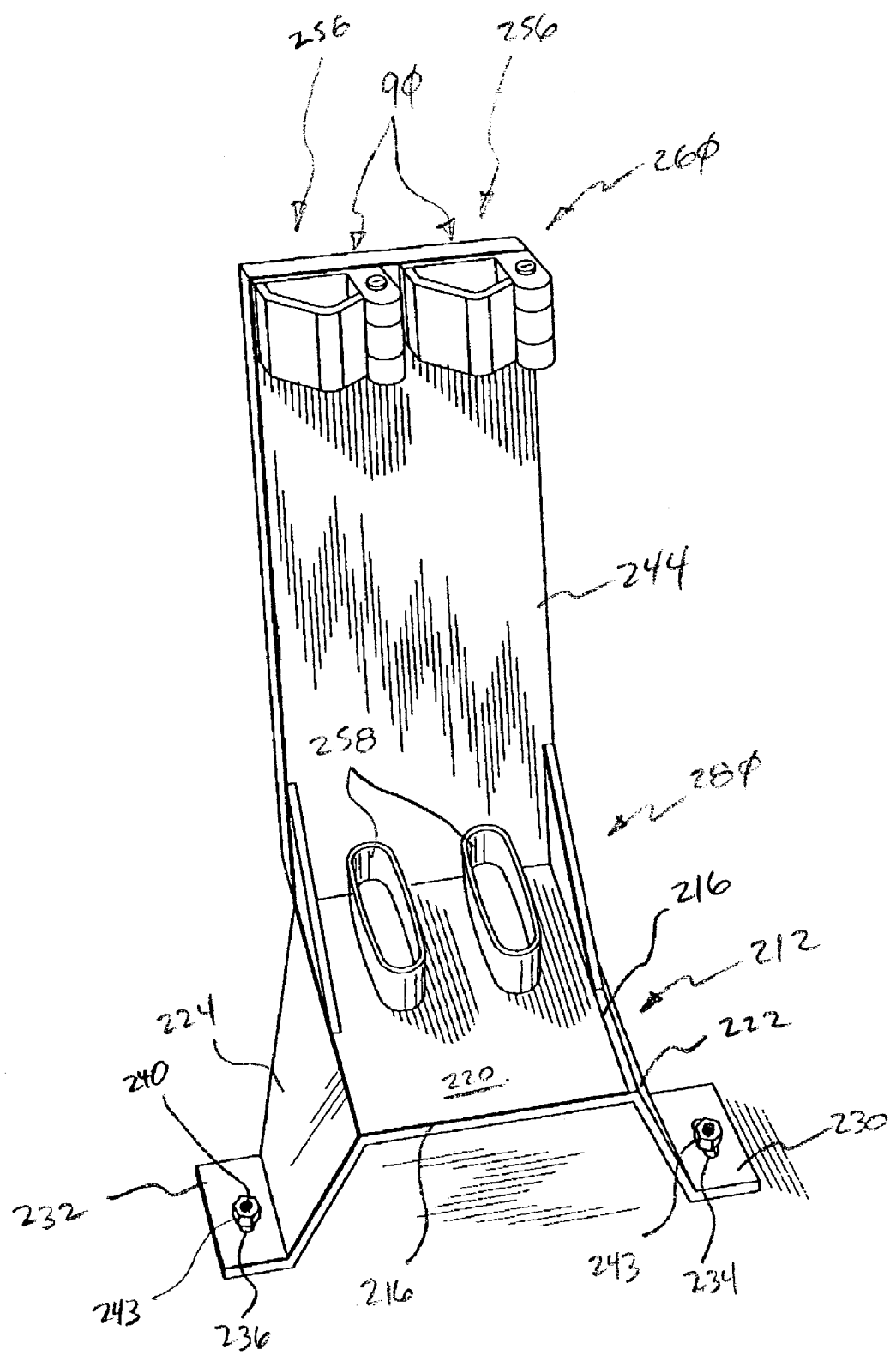
FIG. 10 is a perspective view of a further embodiment of the mounting apparatus of FIG. 7.

As illustrated in FIG. 10, a wide variety of accessory mounts may be combined in different manners on the mounting apparatus 210. For example, a pair of vertically aligned, parallel gun racks 256 may be coupled to the mounting apparatus 210 in order to support a pair of weapons. Other illustrated examples of accessory mounts that may be supported by the mounting apparatus 210 include computer hardware supports or stands, flashlight chargers, radio chargers, and detoxification kit holders. It should be appreciated that the different types and combinations of accessory mounts in no way limits the scope of the present invention.

Figure 11:
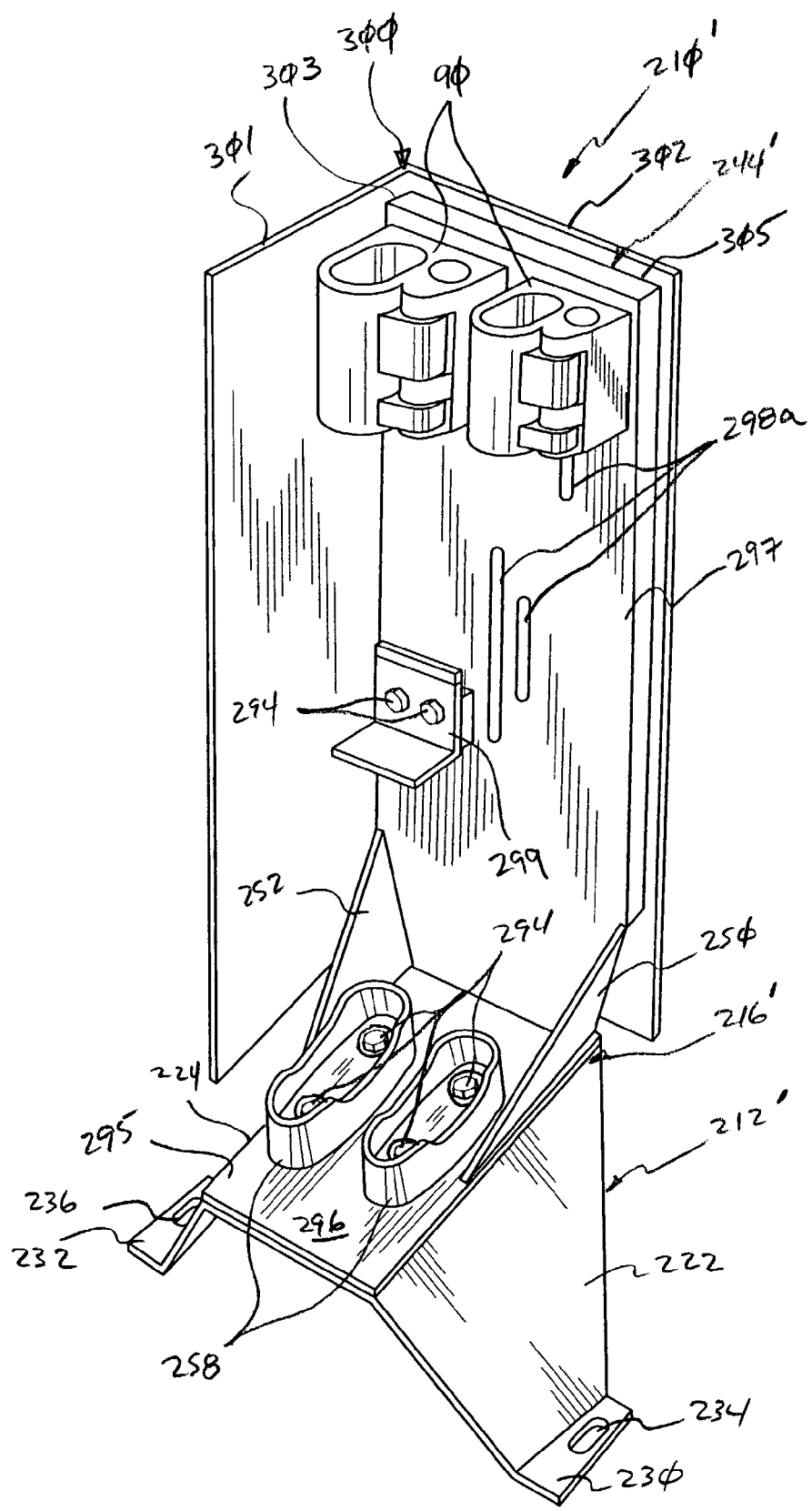
FIG. 11 is a perspective view of a further embodiment of the mounting apparatus of FIG. 7, illustrating the upright supported for selective movement relative to the base and including a partition configured to restrict access to items supported by the mounting apparatus.
Figure 12:
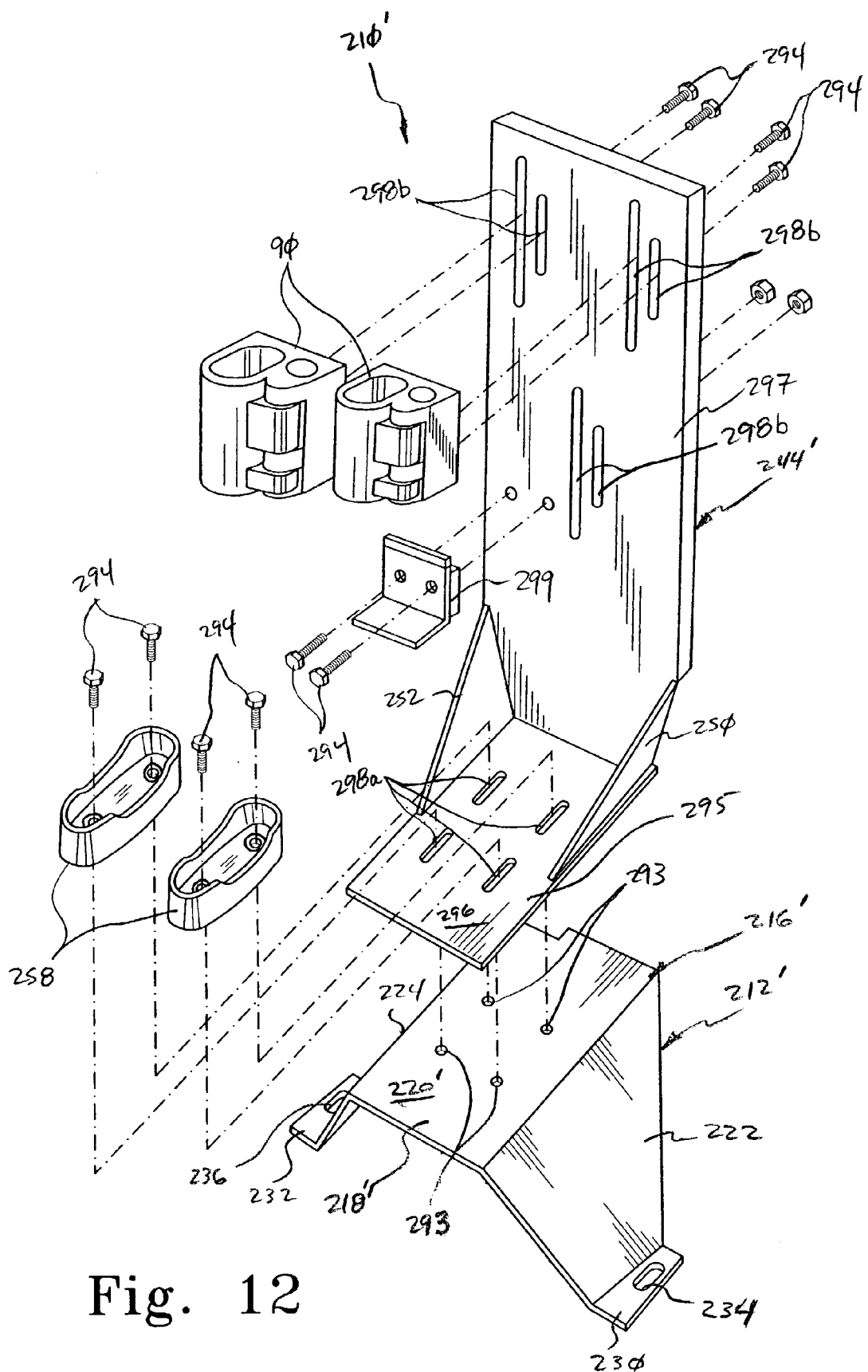
FIG. 12 is an exploded perspective view of the mounting apparatus of FIG. 11, with the partition removed for clarity.

FIGS. 11 and 12 illustrate an alternative embodiment mounting apparatus 210' including a base 212' configured to support an upright 244' for selective movement therebetween. More particularly, the upright 244' may be removed from the base 212' for use in connection with a different base 212'. As such, the upright 244' may find universal application with different bases 212' which are dimensioned or customized for mounting on different types of vehicles. Further, once coupled to the base 212', the upright 244' may be adjusted in a substantially horizontal plane to optimize positioning of the accessory mounts for use by individuals in the front occupant area 20 of the vehicle 14.

The base 212' includes a support 216' illustratively including a mounting platform 218' having a substantially planar support surface 220'. A plurality of apertures 293 are formed within the support surface 220' and are internally threaded to receive conventional fasteners, such as bolts 294. The upright 244' includes a connecting member 295 illustratively including a substantially planar support surface 296. An upright panel 297 is coupled to, and extends upwardly from, the connecting member 295. A plurality of elongated slots 298 are formed within the upright 244', wherein slots 298a are formed within the support surface 296 and are configured to receive conventional bolts 294. More particularly, the bolts 294 pass through accessory mounts, such as butt housings 258, through the slots 298a, and are threadably received within the apertures 293. As may be appreciated, loosening the bolts 294 permits the position of the upright 244' to be adjusted horizontally relative to the base 212'. More particularly, travel of the slots 298a relative to the bolts 294 permits movement of the upright 244' relative to the base 212'. Likewise, removal of the bolts 294 allows for removal of the upright 244' from the base 212'. The upright 244' may then be transferred to a different vehicle 14 and coupled to another base 212'.

Elongated slots 298b are formed within the upright panel 297 and are configured to receive conventional fasteners, such as bolts 294, for attaching accessory mounts, such as lock mechanisms 90, to the mounting apparatus 210'. Again, the elongated slots 298 facilitate adjustment of the position of the accessory mounts relative to the mounting apparatus 210'.

A blocking member, illustratively an L-shaped bracket 299 may be supported by the upright panel 297 intermediate either, or both, of the lock mechanisms 90 and respective butt housings 258. The bracket 299 may be attached to the upright panel 297 through conventional bolts 294 threadably engaging nuts (not shown). The bracket 299 is configured to prevent the charging of a weapon positioned within a respective butt housing 258 and lock mechanism 90 by restricting movement of the bolt of the weapon.

As illustrated in FIG. 11, an L-shaped partition 300 may be coupled to the upright 244' in order to prevent access to certain areas of the mounting apparatus 210' by an individual located within the rear occupant area 22 of the vehicle 14. The partition 300 illustratively includes a side wall 301 coupled to a perpendicularly extending rear wall 302. The partition 300 is coupled to a side edge 303 of the upright panel 297 through conventional fasteners, such as bolts (not shown). The side wall 301 prevents access from the rear occupant area 22 to the accessory mounts, while the rear wall 302 prevents access to electrical wires 304 which are coupled to the lock mechanisms 90 and pass between the rear wall 302 and a rear surface 305 of the upright panel 297

(FIGS. 9 and 11). The partition 300 may be manufactured from a lightweight, impact-resistant thermoplastic material.

As noted above, the upright 244' may have universal application with a variety of different bases 212' customized for different vehicles 14. For example, a first base 212' may be desired for installation within a first vehicle, such as a sports utility vehicle (SUV), having a certain dimension between the driver seat mounting stud 238 and the passenger seat mounting stud 240. An upright 244' may be coupled to the first base 212' through bolts 294. Should an individual wish to use the mounting apparatus 210' in a second vehicle 14, for example a sedan, which is different from the first vehicle, then a transfer kit may be utilized to convert the mounting apparatus 210' for the new installation in the second vehicle 14. The transfer kit includes a second base 212' designed for installation within the second vehicle 14 having a certain dimension between the driver seat mounting stud 238 and the passenger seat mounting stud 240. Using the transfer kit, the individual uncouples the upright 244' from the first base 212' and then couples the upright 244' to the second base 212' through bolts 294.

Figure 13:
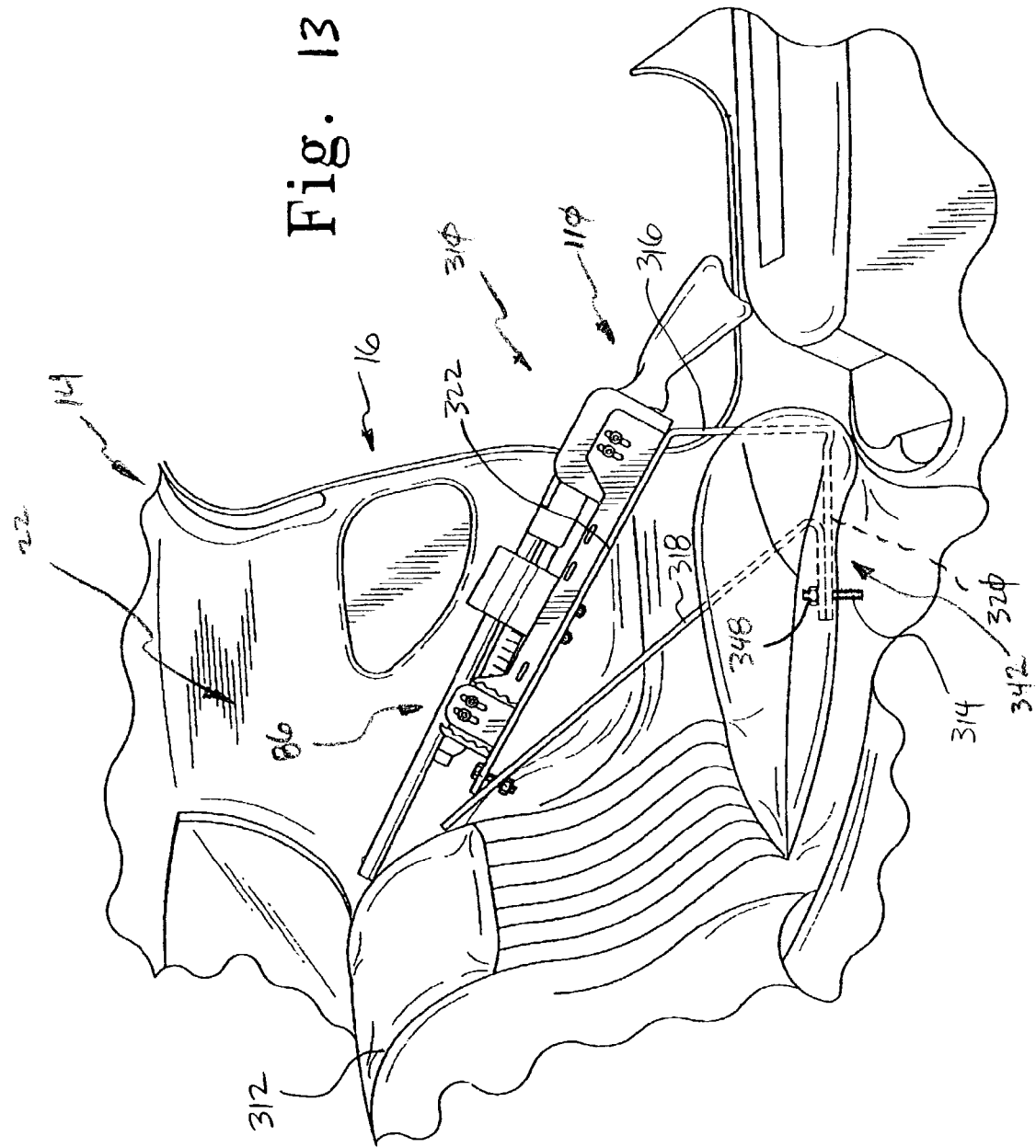
FIG. 13 is a perspective view of a further embodiment mounting apparatus of the present invention, illustrating the mounting apparatus installed within the rear occupant compartment of the vehicle.
Figure 14:
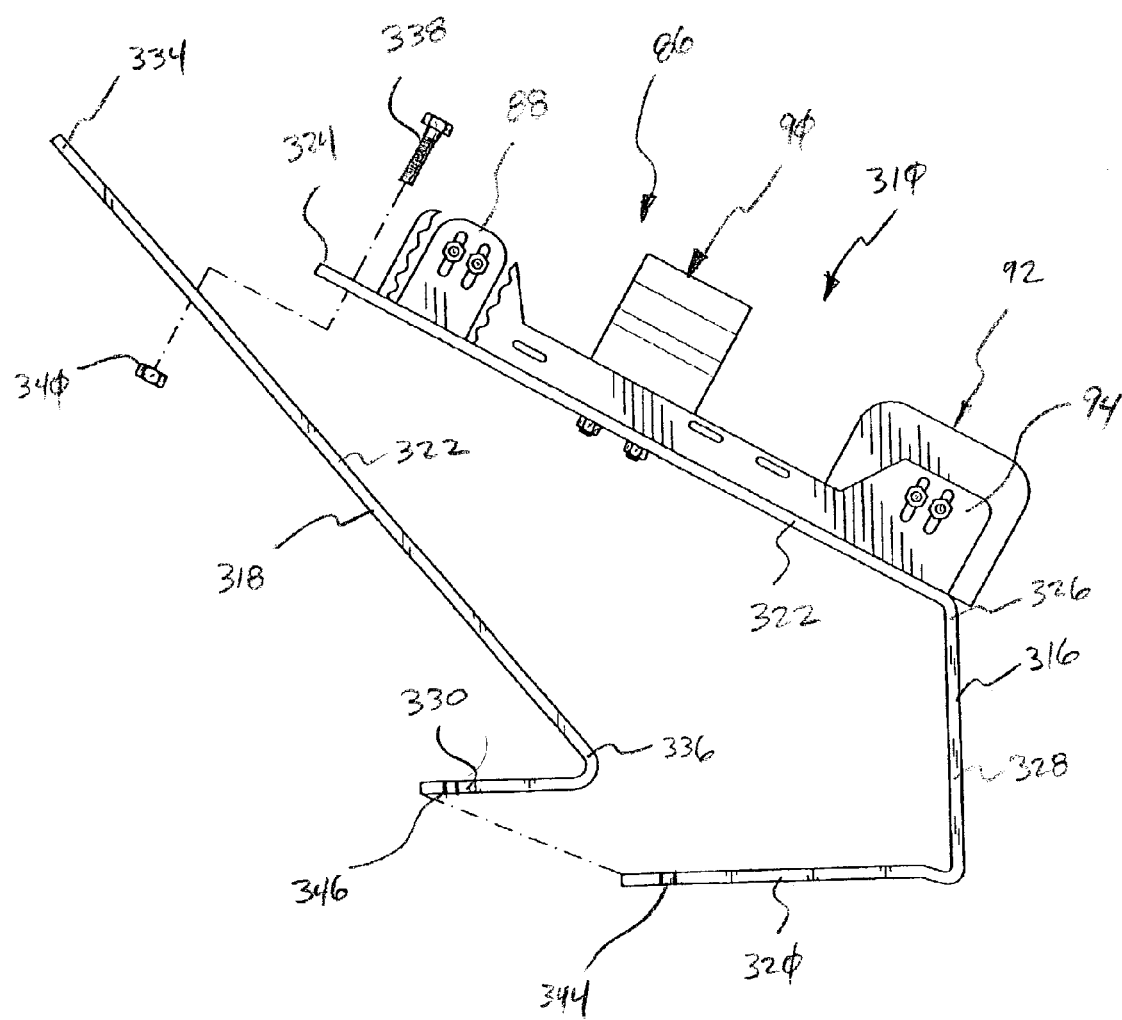
FIG. 14 is an exploded side elevational view of the mounting apparatus of FIG. 13.

Turning now to FIGS. 13 and 14, a further embodiment of the mounting apparatus 310 of the present invention is illustrated as supporting the weapon 110 within the rear occupant area 22 of the vehicle 14. The mounting apparatus 310 is configured to support the weapon 110 above and adjacent a rear passenger seat 312 of the vehicle 14. Moreover, the mounting apparatus 310 is configured to couple to a pre-existing and conventional seat belt mounting stud 314 positioned immediately adjacent to the rear passenger seat 312. As illustrated, the mounting apparatus 310 is supported adjacent to the driver side 16 of the vehicle 14 thereby facilitating easy access by an officer exiting the vehicle 14 from the driver seat 24.

The mounting apparatus 310 includes a first frame member 316 coupled to a second frame member 318. The first frame member 316 includes a base 320 positioned in spaced relation to a support 322 having opposing first and second ends 324 and 326. The first frame member further includes an upright 328 extending upwardly from the base 320 and connecting the base 320 to the second end 326 of the support 322. The second frame member 318 includes a base 330 and a strengthening member 332 having opposing first and second ends 334 and 336. The strengthening member 332 extends upwardly from the base 330.

A first end 324 of the support 322 is coupled to the first end 334 of the strengthening member 332 through a conventional fastener, such as a bolt 338 threadably receiving a nut 340. The base 320 of the first frame member 316 and the base 330 of the second frame member 318 partially overlap and together define a mounting member 342 including a pair of coaxially aligned mounting apertures 344 and 346. The seat belt mounting stud 314 passes through the coaxially aligned mounting apertures 344 and 346 and is secured thereto through a conventional securing device, such as nut 348.

A weapon holder or gun rack 86 is secured to the support 322. The gun rack 86 may be of conventional design and preferably comprises a gun rack 86 similar to that described in detail above as including a barrel rest 88, a lock mechanism 90, and a weapon trigger guard 92 supported by or coupled to an elongated support 94.

While the invention has been described in detail with reference to the certain illustrative embodiments, variations and modifications exist within the spirit and scope of the invention as defined in the following claims.

What is claimed is:

1. A mounting apparatus for supporting a weapon within a vehicle including a floor, front and rear occupant areas, and at least one seat supported in the front occupant area, the mounting apparatus comprising:
    a base frame configured to be coupled to the floor of the vehicle;
    an upright extending upwardly from the base frame in a generally vertical direction, the upright including opposing lower and upper ends;
    a weapon holder supported by the upright and configured to support a weapon substantially parallel to the upright and in spaced relation above the base frame;
    a coupler connecting the upright to the base frame, the coupler configured to permit selective movement of the upper end of the upright relative to the base frame; and
    wherein the weapon holder is configured to move the weapon concurrently with movement of the upright.

2. The mounting apparatus of claim 1, wherein the coupler includes a first pivot connector and a second releasable connector positioned above the first pivot connector, the releasable connector adapted to release the upright for movement about the pivot connector upon application to the upright of a force greater than a predetermined value.

3. The mounting apparatus of claim 2, wherein the coupler further includes a pair of mounting flanges extending upwardly from the base frame and receiving the lower end of the upright.

4. The mounting apparatus of claim 1, wherein the coupler includes an inhibiting member configured to prevent movement of the upright relative to the base frame in a first direction while permitting movement of the upright relative to the base frame in a second direction.

5. The mounting apparatus of claim 1, wherein the weapon holder includes a trigger guard provided proximate an end of the elongated support, the trigger guard including:
    a base having two spaced apart side walls which extend outwardly from the base to form a channel for receiving a trigger assembly of a weapon; and
    an insert secured in the channel and including a slot in an upper surface thereof for receiving a trigger and trigger guard of the weapon, the two side walls extending outwardly beyond the insert to receive a portion of a weapon therebetween.

6. The mounting apparatus of claim 1, wherein the weapon holder includes:
    a barrel rest for receiving a barrel of a weapon; and
    a lock mechanism provided in spaced relation to the barrel rest for receiving and securing the weapon therein.

7. The mounting apparatus of claim 6, wherein the weapon holder further includes:
    a weapon trigger guard provided in spaced relation to the lock mechanism for receiving a trigger portion of the weapon therein, the weapon trigger guard including,
    a base having two spaced apart side walls which extend outwardly from the base to form a channel for receiving a trigger assembly of the weapon, and
    an insert secured in the channel and including a slot in an outer surface thereof for receiving a trigger and trigger guard of the weapon.

8. A mounting apparatus for supporting a weapon within a vehicle including a floor, front and rear occupant areas, and at least one seat supported in the front occupant area, the mounting apparatus comprising:
    a base frame configured to be supported by the floor of the vehicle within the rear occupant area;

an upright extending upwardly from the base frame in a generally vertical direction behind the at least one seat supported in the front occupant area, wherein the upright is configured to provide clearance for the pivoting movement of a back of the at least one seat; and a weapon holder supported by the upright and including a barrel rest for receiving a barrel of a weapon, and a lock mechanism provided in spaced relation to the barrel rest for receiving and securing the weapon therein.

9. The mounting apparatus of claim 8, wherein the upright is angled between 10 degrees and 70 degrees from vertical.

10. The mounting apparatus of claim 9, wherein the upright is angled between 15 degrees and 45 degrees from vertical.

11. The mounting apparatus of claim 8, wherein the base frame includes: an elongated support having opposing first and second ends;

first and second mounting members supported proximate the first and second ends of the support; and wherein the first and second mounting members are configured to secure the base frame to the floor of the vehicle.

12. The mounting apparatus of claim 11, wherein the first and second mounting members each include a mounting aperture configured to receive a seat mounting stud coupled to the floor of the automobile.

13. The mounting apparatus of claim 8, wherein the weapon holder further includes:

a weapon trigger guard provided in spaced relation to the lock mechanism for receiving a trigger portion of the weapon therein, the weapon trigger guard including, a base having two spaced apart side walls which extend outwardly from the base to form a channel for receiving a trigger assembly of the weapon, and an insert secured in the channel and including a slot in an outer surface thereof for receiving a trigger and trigger guard of the weapon.

14. The mounting apparatus of claim 8, wherein the weapon holder includes a trigger guard provided proximate an end of the elongated support, the trigger guard including:

a base having two spaced apart side walls which extend outwardly from the base to form a channel for receiving a trigger assembly of a weapon; and an insert secured in the channel and including a slot in an outer surface thereof for receiving a trigger and trigger guard of the weapon, the two side walls extending outwardly beyond the insert to receive a portion of a weapon therebetween.

15. A mounting apparatus for supporting a weapon within a vehicle including a floor, front and rear occupant areas, and at least one seat supported in the front occupant area, the mounting apparatus comprising:

a base frame configured to be supported by the floor of the vehicle, the base frame including an elongated base member and first and second mounting members supported proximate opposing ends of the base member, the first and second mounting members each including a mounting aperture configured to receive a fastener, wherein a distance between the aperture of the first mounting member and the aperture of the second mounting member is adjustable;

an upright extending upwardly from the base frame in a generally vertical direction, the upright including opposing lower and upper ends; and a weapon holder supported by the upright and configured to hold a weapon.

16. The mounting apparatus of claim 15, wherein the base member includes a first portion and a second portion telescopingly received within the first portion.

17. The mounting apparatus of claim 15, wherein the fastener configured to be received within each mounting aperture comprises a seat mounting stud coupled to the floor of the automobile.

18. The mounting apparatus of claim 15, wherein the weapon holder includes:

a barrel rest for receiving a barrel of a weapon; and a lock mechanism provided in spaced relation to the barrel rest for receiving and securing the weapon therein.

19. The mounting apparatus of claim 18, wherein the weapon holder further includes:

a weapon trigger guard provided in spaced relation to the lock mechanism for receiving a trigger portion of the weapon therein, the weapon trigger guard including, a base having two spaced apart side walls which extend outwardly from the base to form a channel for receiving a trigger assembly of the weapon, and an insert secured in the channel and including a slot in an outer surface thereof for receiving a trigger and trigger guard of the weapon.

20. The mounting apparatus of claim 15, wherein the weapon holder includes a trigger guard provided proximate an end of the elongated support, the trigger guard including:

a base having two spaced apart side walls which extend outwardly from the base to form a channel for receiving a trigger assembly of a weapon; and an insert secured in the channel and including a slot in an outer surface thereof for receiving a trigger and trigger guard of the weapon, the two side walls extending upwardly beyond the insert to receive a portion of a weapon therebetween.

21. A method of supporting an accessory within a vehicle, the method comprising the steps of:

providing a first base including a support and first and second mounting members coupled to the support, the first and second mounting members configured to couple to seat mounting studs of a first vehicle;

coupling the first base to the seat mounting studs of the first vehicle; providing an upright;

coupling the upright to the first base;

providing a second base including a support and first and second mounting members coupled to the support, the first and second mounting members configured to coupled to seat mounting studs of a second vehicle;

coupling the second base to the seat mounting studs of the second vehicle;

uncoupling the upright from the first base; removing the upright from the first vehicle; and coupling the upright to the second base.

22. The method of claim 21, further comprising the step of coupling an accessory mount to the upright.

23. The method of claim 21, further comprising the step of adjusting the horizontal position of the upright relative to the first base following the step of coupling the upright to the first base.

24. The method of claim 23, wherein the upright includes a connecting member, and an upright panel coupled to the connecting member, and an elongated slot is formed within at least one of the connecting member of the upright and the mounting platform of the first base, the elongated slot being configured to receive a coupler connecting the upright to the first base.

25. A mounting apparatus for supporting a weapon within a vehicle including a floor, front and rear occupant areas, and at least one seat supported in the front occupant area, the mounting apparatus comprising:
   a base frame configured to be supported by the floor of the vehicle;
   an upright extending upwardly from the base frame in a generally vertical direction, the upright including opposing lower and upper ends;
   a coupler connecting the upright to the base frame, the coupler configured to permit selective movement of the upper end of the upright relative to the base frame; and
   a weapon holder supported by the upright and configured to receive a weapon, wherein the weapon holder includes a barrel rest for receiving a barrel of a weapon, and a lock mechanism provided in spaced relation to the barrel rest for receiving and securing the weapon therein.

26. The mounting apparatus of claim 25, wherein the weapon holder further includes:
   a weapon trigger guard provided in spaced relation to the lock mechanism for receiving a trigger portion of the weapon therein, the weapon trigger guard including,
   a base having two spaced apart side walls which extend outwardly from the base to form a channel for receiving a trigger assembly of the weapon, and
   an insert secured in the channel and including a slot in an outer surface thereof for receiving a trigger and trigger guard of the weapon.

27. The mounting apparatus of claim 25, wherein the weapon holder includes a trigger guard provided proximate an end of the elongated support, the trigger guard including:
   a base having two spaced apart side walls which extend outwardly from the base to form a channel for receiving a trigger assembly of a weapon; and
   an insert secured in the channel and including a slot in an upper surface thereof for receiving a trigger and trigger guard of the weapon, the two side walls extending outwardly beyond the insert to receive a portion of a weapon therebetween.

28. The mounting apparatus of claim 25, wherein the coupler includes a first pivot connector and a second releasable connector positioned above the first pivot connector, the releasable connector adapted to release the upright for movement about the pivot connector upon application to the upright of a force greater that a predetermined value.

29. The mounting apparatus of claim 28, wherein the coupler further includes a pair of mounting flanges extending upwardly from the base frame and receiving the lower end of the upright.

30. The mounting apparatus of claim 25, wherein the coupler includes an inhibiting member configured to prevent movement of the upright relative to the base frame in a first direction while permitting movement of the upright relative to the base frame in a second direction.

31. A mounting apparatus for supporting a weapon within a vehicle including a floor, front and rear occupant areas, and at least one seat supported in the front occupant area, the mounting apparatus comprising:
   a base frame configured to be supported by the floor of the vehicle within the rear occupant area;
   an upright extending upwardly from the base frame in a generally vertical direction behind the at least one seat supported in the front occupant area, wherein the upright is configured to provide clearance for the pivoting movement of a back of the at least one seat;
   a weapon holder supported by the upright and configured to receive a weapon, the weapon holder including a weapon trigger guard for receiving a trigger portion of the weapon therein.

32. The mounting apparatus of claim 31, wherein the upright is angled between 10 degrees and 70 degrees from vertical.

33. The mounting apparatus of claim 32, wherein the upright is angled between 15 degrees and 45 degrees from vertical.

34. The mounting apparatus of claim 31, wherein the base frame includes:
   an elongated support having opposing first and second ends;
   first and second mounting members supported proximate the first and second ends of the support; and
   wherein the first and second mounting members are configured to secure the base frame to the floor of the vehicle.

35. The mounting apparatus of claim 34, wherein the first and second mounting members each include a mounting aperture configured to receive a seat mounting stud coupled to the floor of the automobile.

36. The mounting apparatus of claim 31, wherein the weapon holder includes:
   a barrel rest for receiving a barrel of a weapon; and
   a lock mechanism provided in spaced relation to the barrel rest for receiving and securing the weapon therein.

37. The mounting apparatus of claim 36, wherein the weapon trigger guard includes:
   a base having two spaced apart side walls which extend outwardly from the base to form a channel for receiving a trigger assembly of the weapon, and
   an insert secured in the channel and including a slot in an outer surface thereof for receiving a trigger and trigger guard of the weapon.

38. A mounting apparatus for supporting a weapon within a vehicle including a floor, front and rear occupant areas, and at least one seat supported in the front occupant area, the mounting apparatus comprising:
   a base frame configured to be supported by the floor of the vehicle, the base frame including an elongated base member and first and second mounting members supported proximate opposing ends of the base member, wherein a distance between the first mounting member and the second mounting member is adjustable;
   an upright extending upwardly from the base frame in a generally vertical direction, the upright including opposing lower and upper ends;
   a weapon holder supported by the upright and configured to hold a weapon; and
   wherein the base member includes a first portion and a second portion telescopingly received within the first portion.

39. The mounting apparatus of claim 38, wherein the first and second mounting members each include a mounting aperture configured to receive a seat mounting stud coupled to the floor of the automobile.

40. The mounting apparatus of claim 38, wherein the weapon holder includes:
   a barrel rest for receiving a barrel of a weapon; and
   a lock mechanism provided in spaced relation to the barrel rest for receiving and securing the weapon therein.

41. The mounting apparatus of claim 40, wherein the weapon holder further includes:

a weapon trigger guard provided in spaced relation to the lock mechanism for receiving a trigger portion of the weapon therein, the weapon trigger guard including, a base having two spaced apart side walls which extend outwardly from the base to form a channel for receiving a trigger assembly of the weapon, and an insert secured in the channel and including a slot in an outer surface thereof for receiving a trigger and trigger guard of the weapon.

42. The mounting apparatus of claim 38, wherein the weapon holder includes a trigger guard provided proximate an end of the elongated support, the trigger guard including:

a base having two spaced apart side walls which extend outwardly from the base to form a channel for receiving a trigger assembly of a weapon; and an insert secured in the channel and including a slot in an outer surface thereof for receiving a trigger and trigger guard of the weapon, the two side walls extending upwardly beyond the insert to receive a portion of a weapon therebetween.

43. A mounting apparatus for supporting a weapon within a vehicle including a floor, front and rear occupant areas, and at least one seat supported in the front occupant area, the mounting apparatus comprising:

a base frame configured to be supported by the floor of the vehicle, the base frame including an elongated base member and first and second mounting members supported proximate opposing ends of the base member, wherein a distance between the first mounting member and the second mounting member is adjustable;

an upright extending upwardly from the base frame in a generally vertical direction, the upright including opposing lower and upper ends; and a weapon holder supported by the upright and configured to hold a weapon, the weapon holder including a barrel rest for receiving a barrel of the weapon, and a lock mechanism provided in spaced relation to the barrel rest for receiving and securing the weapon therein.

44. The mounting apparatus of claim 43, wherein the base member includes a first portion and a second portion telescopingly received within the first portion.

45. The mounting apparatus of claim 43, wherein the first and second mounting members each include a mounting aperture configured to receive a seat mounting stud coupled to the floor of the automobile.

46. The mounting apparatus of claim 43, wherein the weapon holder further includes:

a weapon trigger guard provided in spaced relation to the lock mechanism for receiving a trigger portion of the weapon therein, the weapon trigger guard including, a base having two spaced apart side walls which extend outwardly from the base to form a channel for receiving a trigger assembly of the weapon, and an insert secured in the channel and including a slot in an outer surface thereof for receiving a trigger and trigger guard of the weapon.

\* \* \* \* \*